US011355756B2

United States Patent
Kim et al.

(10) Patent No.: US 11,355,756 B2
(45) Date of Patent: Jun. 7, 2022

(54) POSITIVE ELECTRODE FOR ZN—BR BATTERY (ZBB) AND METHOD OF MANUFACTURING THE SAME

(71) Applicant: Korea Advanced Institute of Science and Technology, Daejeon (KR)

(72) Inventors: Hee-Tak Kim, Daejeon (KR); Sang Ouk Kim, Daejeon (KR); Juhyuk Lee, Daejeon (KR); Year in Byun, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 73 days.

(21) Appl. No.: 16/842,597

(22) Filed: Apr. 7, 2020

(65) Prior Publication Data

US 2021/0066719 A1    Mar. 4, 2021

(30) Foreign Application Priority Data

Aug. 30, 2019   (KR) ........................ 10-2019-0106976

(51) Int. Cl.
| | |
|---|---|
| *H01M 4/60* | (2006.01) |
| *H01M 4/38* | (2006.01) |
| *H01M 4/583* | (2010.01) |
| *H01M 10/38* | (2006.01) |
| *H01M 4/04* | (2006.01) |
| *H01M 10/36* | (2010.01) |

(52) U.S. Cl.
CPC ........... *H01M 4/60* (2013.01); *H01M 4/0416* (2013.01); *H01M 4/0471* (2013.01); *H01M 4/38* (2013.01); *H01M 4/583* (2013.01); *H01M 10/365* (2013.01); *H01M 10/38* (2013.01); *H01M 2300/0005* (2013.01)

(58) Field of Classification Search
CPC .......... H01M 4/60; H01M 4/38; H01M 4/583; H01M 4/0416; H01M 4/0471; H01M 10/38; H01M 10/365
See application file for complete search history.

(56) References Cited

FOREIGN PATENT DOCUMENTS

| | | |
|---|---|---|
| CN | 106694007 A | 5/2017 |
| CN | 109841852 A | 6/2019 |
| JP | S59-146171 A | 8/1984 |
| JP | H6-283157 A | 10/1994 |
| JP | H11-242954 A | 9/1999 |
| KR | 10-1862368 B1 | 5/2018 |
| KR | 10-2019-0072124 A | 6/2019 |
| WO | 2017/172878 A1 | 10/2017 |
| WO | 2018/071469 A1 | 4/2018 |
| WO | 2018/222785 A1 | 12/2018 |

OTHER PUBLICATIONS

Seiichi et al., "Research on lead-bromine secondary batteries for non-diaphragm type vehicles", University of Toyama Engineering, vol. 43, p. 83-91—11 pages (1992).
Office Action of Japanese Patent Application No. 2020-067221—9 pages (dated Jun. 2, 2021).
Office Action in KR Patent Application No. 10-2019-0106976 dated Oct. 20, 2020 in 6 pages.
Wang, et al., "From zeolite-type metal organic framework to porous nano-sheet carbon: High activity positive electrode material for bromine based flow batteries," Nano Energy 44 (2018) 240-247 in 8 pages.
Lee et al., "A membrane-fee battery", International Convention Center Jeju—18 pages (Apr. 5, 2019).

*Primary Examiner* — Sarah A. Slifka
(74) *Attorney, Agent, or Firm* — Knobbe Martens Olson & Bear LLP (57) ABSTRACT

Provided are a positive electrode for a Zn—Br battery, a Zn—Br battery including the same, and a method of manufacturing the positive electrode for a Zn—Br battery. The positive electrode for a Zn—Br battery includes a carbon body doped with pyridinic nitrogen. The Zn—Br battery includes a negative electrode including a transition metal coated with zinc, the positive electrode; and an electrolyte. A pH of the electrolyte is in a range of 1.5 to 5.

16 Claims, 9 Drawing Sheets

POSITIVE ELECTRODE FOR ZN—BR BATTERY (ZBB) AND METHOD OF MANUFACTURING THE SAME

CROSS-REFERENCE TO RELATED APPLICATIONS

This application claims priority under 35 U.S.C. § 119 to Korean Patent Application No. 10-2019-0106976, filed on Aug. 30, 2019, in the Korean Intellectual Property Office, the disclosure of which is incorporated herein by reference in its entirety.

TECHNICAL FIELD

The following disclosure relates to a positive electrode for a Zn—Br battery, a Zn—Br battery including the same, and a method of manufacturing the positive electrode for a Zn—Br battery.

BACKGROUND

With the recent increasing interest in inhibiting the generation of global-warming gases, power generation systems using renewable energy such as sunlight, wind power, and the like have been actively researched and distributed all over the world. However, because the renewable energy such as sunlight, wind power, and the like depend on natural energy having a high variability, it has a drawback in that it is difficult to respond to the variability of electric power and it is difficult to secure the stability of electric power supply. Therefore, stable energy storage technology for accepting the variability of renewable energy, smoothly supplying electric power, and making efficient use of power generation facilities is needed.

Much research on redox flow batteries using an electrochemical method as the stable energy storage technology has been conducted. In particular, Zn—Br batteries have come into the spotlight due to their advantages such as price competitiveness, a high discharge voltage, and the like.

RELATED ART DOCUMENTS

Patent Documents

KR 10-2019-0072124 A (Jun. 25, 2019)
KR 10-1862368 B1 (May 23, 2018)

SUMMARY

An embodiment of the present invention is directed to providing a positive electrode for a Zn—Br battery capable of avoiding, reducing or minimizing crossover of brominated anions from a positive electrode to a negative electrode to improve current efficiency and voltage efficiency of a Zn—Br battery and showing excellent charge/discharge cycle stability as well, and a method of manufacturing the same.

In one general aspect, a positive electrode for a Zn—Br battery is provided, which includes a carbon body doped with pyridinic nitrogen.

The Zn—Br battery may be a membraneless flowless Zn—Br battery.

The carbon body doped with pyridinic nitrogen may be a microporous carbon body including micropores.

The micropores may have an average pore size of 0.2 to 3 nm.

The pyridinic nitrogen may be present at 30 atom % or more with respect to the total nitrogen content of the nitrogen-doped carbon body.

The pyridinic nitrogen may be positively charged pyridinic nitrogen.

The carbon body doped with pyridinic nitrogen may further include a porous carbon body substrate, and the porous carbon body substrate and the carbon body doped with pyridinic nitrogen may be integrated with each other.

Adsorption energies of the carbon body doped with pyridinic nitrogen and the brominated anions may satisfy the following Expression 1:

$$E_{Ad-CN}/E_{Ad-C} > 5 \quad \text{[Expression 1]}$$

(Wherein $E_{Ad-CN}$ represents an adsorption energy of a carbon body doped with pyridinic nitrogen and brominated anions, and $E_{Ad-C}$ represents an adsorption energy of a carbon body and brominated anions).

In another general aspect, a Zn—Br battery is provided, which includes a negative electrode including a transition metal coated with zinc, the positive electrode according to an exemplary embodiment of the present invention, and an electrolyte, wherein a pH of the electrolyte is in a range of 1.5 to 5.

A drop in open circuit voltage of the Zn—Br battery may last for 40 hours or more.

The Zn—Br battery may have an energy efficiency of 70% or more for 1,000 charge/discharge cycles.

In still another general aspect, a method of manufacturing a positive electrode for a Zn—Br battery is provided, which includes:

(S1) subjecting a porous carbon body substrate to hydrophilic surface treatment;

(S2) immersing the hydrophilized porous carbon body substrate in a solution including a metal precursor and an organic ligand precursor;

(S3) drying the immersed porous carbon body substrate to coat the porous carbon body substrate with nanocrystalline polyhedrons including metal-organic frameworks (MOFs); and (S4) carbonizing the porous carbon body substrate coated with the nanocrystalline polyhedrons.

The metal-organic frameworks may be zeolitic-imidazolate frameworks (ZIFs).

The carbonization process of the step (S4) may be performed at 500 to 1,200° C.

The hydrophilic surface treatment process of the step (S1) may be performed at 400 to 800° C. under an oxidizing atmosphere.

DETAILED DESCRIPTION OF EMBODIMENTS

Unless otherwise defined, the technical and scientific terms used herein have the same meaning as commonly understood by one of ordinary skill in the art to which the present invention belongs. In the following description and the accompanying drawings, a description of known functions and configurations, which may unnecessarily obscure the subject matter of the present invention, will be omitted.

Also, the singular forms "a," "an," and "the" used in this specification are intended to include plural referents unless the context clearly dictates otherwise.

In addition, the units used without any particular comments in this specification are based on weight. For example, the units of % or percentage refer to a percent (%) by weight or weight percentage. Unless otherwise defined, the percent (%) by weight or weight percentage refers to a percent (%) by weight or weight percentage of any one component in a composition with respect to the total weight of the composition.

Further, a numerical range used in this specification is meant to include its upper and lower limits and all possible combinations of all values falling within these limits, increments logically derived from the shapes and widths of defined ranges, all defined values thereof, and upper and lower limits of the numerical ranges defined in different types. Unless otherwise particularly defined in this specification, all values falling out of this numerical range that may occur due to the rounding off of the experimental errors or values also fall within the defined numerical ranges.

In this specification, the expression "comprise(s)" is intended to be an open-ended transitional phrase having an equivalent meaning with "include(s)," "have," "has," "contain(s)," and "is (are) characterized by," and does not exclude elements, materials, or steps, all of which are not further recited herein.

Further, in this specification, the term "substantially" means that one element, material, or step, which is not recited in combination with the other elements, materials, or steps, may be present at an amount or level having no unacceptably significant influence on at least one basic and novel technical idea of the invention.

As discussed above, much research on redox flow batteries using an electrochemical method as the stable energy storage technology has been conducted. In particular, Zn—Br batteries have come into the spotlight due to their advantages such as price competitiveness, a high discharge voltage, and the like. However, because the Zn—Br batteries may have, for example, crossover of brominated anions from a positive electrode to a negative electrode, in the Zn—Br batteries, low current efficiency may be caused, and the voltage efficiency may also be degraded during long-term charging and discharging, resulting in degraded performance. In addition, in the Zn—Br batteries, the discharge capacity of the Zn—Br batteries may be reduced at a high speed due to, for example, crossover, and the like.

In one implementation, a membraneless flowless Zn—Br battery which does not use an electrolyte pumping system and a membrane in a Zn—Br battery is provided to avoid factors such as energy loss caused during an electrolyte pumping process, the high cost and short lifespan of a membrane, and the like. In this case, the membraneless flowless Zn—Br battery may have, for example, the more severe crossover that may be caused compared to the Zn—Br batteries employing the electrolyte flow and a membrane, resulting in a more accelerated decrease in performance and discharge capacity.

Therefore, to address the crossover of the brominated ions and the brominated compound, there is a need for development of a high-performance Zn—Br battery showing high current efficiency and voltage efficiency and a positive electrode applicable to the membraneless flowless Zn—Br battery as well.

Embodiments of The present invention provides a positive electrode for a Zn—Br battery including a carbon body doped with pyridinic nitrogen (pyridinic N). Some Zn—Br batteries may be severely self-discharged due to, for example, the crossover of a brominated compound and brominated anions from a positive electrode to a negative electrode, and thus, those Zn—Br batteries may show low current efficiency and degraded voltage efficiency as well, which results in remarkably degraded battery capacity and performance. On the contrary, the positive electrode for a Zn—Br battery according to embodiments of the present invention has an advantage in that the positive electrode for a Zn—Br battery may show high energy efficiency and stably maintain the energy efficiency during long-term charging and discharging.

Figure 1:
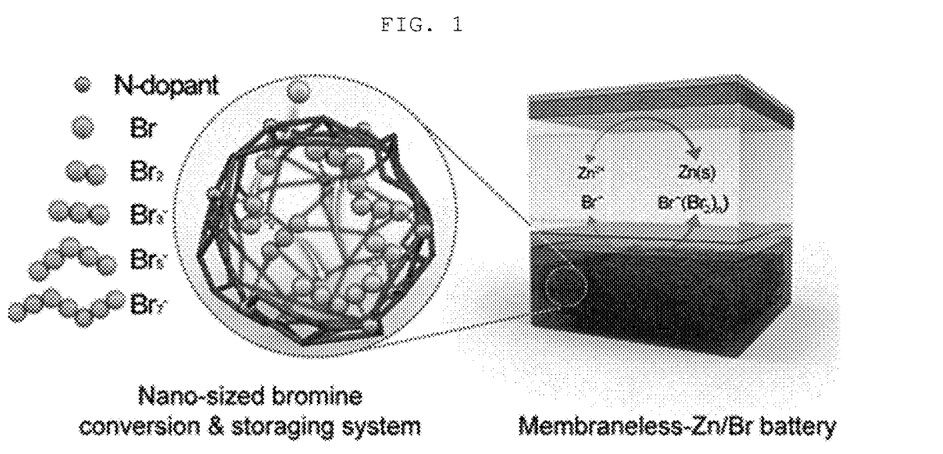
FIG. 1 is a diagram showing a mechanism of a positive electrode for a Zn—Br battery according to embodiments of the present invention to adsorb a brominated compound and brominated anions.

Specifically, the positive electrode for a Zn—Br battery according to embodiments of the present invention may adsorb a brominated compound and brominated anions, which cause the self-discharge, with high efficiency, thereby efficiently preventing the crossover of the brominated compound and brominated anions from a positive electrode to a negative electrode. Therefore, the positive electrode for a Zn—Br battery may show high current efficiency because the self-discharge caused by the crossover may be effectively reduced. Specifically, as shown in FIG. 1, the positive electrode for a Zn—Br battery according to embodiments of the present invention may remarkably prevent the crossover of a nano-sized brominated compound and brominated anions from the positive electrode to the negative electrode during a charging process because the nano-sized brominated compound and brominated anions may be adsorbed in the Zn—Br battery to "store" the nano-sized brominated compound and brominated anions in the electrode. Here, the "storage" refers to a process of temporarily adsorbing a positive electrode product produced during a charging process onto a positive electrode, and may mean a "storage" in a concept of prevention of the crossover to the negative electrode. The brominated compound may be $Br_2$, and the brominated anions may be one or more selected from bromine ions ($Br^-$) and polybromine ions. Specifically, the polybromine ions may be one or more selected from $Br_2^-$, $Br_3^-$, $Br_5^-$, $Br_7^-$, and $Br_9^-$, but the present invention is not limited thereto.

Also, the positive electrode for a Zn—Br battery according to embodiments of the present invention may show excellent positive electrode kinetics due to remarkably reduced resistance, thereby showing high voltage efficiency.

The Zn—Br battery according to embodiments of the present invention may be a membraneless flowless Zn—Br battery. Specifically, the membraneless flowless Zn—Br battery refers to a Zn—Br battery that does not employ the flow of an electrolyte by a pumping system and a membrane that is disposed between the positive electrode and the negative electrode and acts as a separator. The membraneless flowless Zn—Br battery may show low current efficiency and low voltage efficiency due to the much more severe crossover than that of the Zn—Br batteries employing the membrane and the electrolyte flow, thereby degrading the battery capacity and performance at a relatively faster speed. However, even when the positive electrode including the carbon body doped with pyridinic nitrogen according to embodiments of the present invention is used as a positive electrode of the membraneless flowless Zn—Br battery, the positive electrode according to embodiments of the present invention has an advantage in that the positive electrode may maintain high energy efficiency, stable charge/discharge performance, and discharge capacity.

The adsorption energies of the carbon body doped with pyridinic nitrogen and the brominated anions according to embodiments of the present invention may satisfy the following Expression 1:

$$E_{Ad-CN}/E_{Ad-C} > 5 \quad \text{[Expression 1]}$$

(Wherein $E_{Ad-CN}$ represents an adsorption energy of a carbon body doped with pyridinic nitrogen and brominated anions, and $E_{Ad-C}$ represents an adsorption energy of a carbon body and brominated anions).

Specifically, an adsorption energy value of the carbon body doped with pyridinic nitrogen and the brominated anions may be shown to be 5-fold to 100-fold higher than an adsorption energy value of a carbon body, which is not doped with nitrogen, and brominated anions. More specifically, the carbon body doped with pyridinic nitrogen may be strongly adsorbed onto bromine ions ($Br^-$) at a 50-fold to 100-fold ratio with respect to the carbon body which is not doped with nitrogen. That is, because the brominated anions may be adsorbed onto the carbon body doped with pyridinic nitrogen by a relatively much stronger adsorptive force due to the high adsorption energy value, the crossover of the brominated anions from the positive electrode to the negative electrode during a charging process may be remarkably reduced, and the utility of a positive electrode active material in the positive electrode may also be enhanced, thereby showing high battery capacity even during a long-term charging/discharging process.

The pyridinic nitrogen may be present at 30 atom % or more with respect to the total nitrogen content of the nitrogen-doped carbon body. More specifically, in addition to the pyridinic nitrogen, the nitrogen with which the carbon body is doped may further include one selected from nitrile nitrogen (nitrile N), pyrrolic nitrogen (pyrrolic N), quaternary nitrogen (quaternary N), and oxidized nitrogen (oxidized N), or a combination of two or more types thereof. In this case, because the nitrogen-doped carbon body preferentially includes 30 atom % or more, desirably 40 atom % or more, of pyridinic nitrogen with respect to the total nitrogen content, the aforementioned brominated compound and brominated anions may be adsorbed at a high adsorptive force and efficiency, thereby efficiently reducing the self-discharge caused by the crossover of the brominated compound and brominated anions. As a non-limiting example, the content of the pyridinic nitrogen may be less than or equal to 80 atom %.

Figure 2:
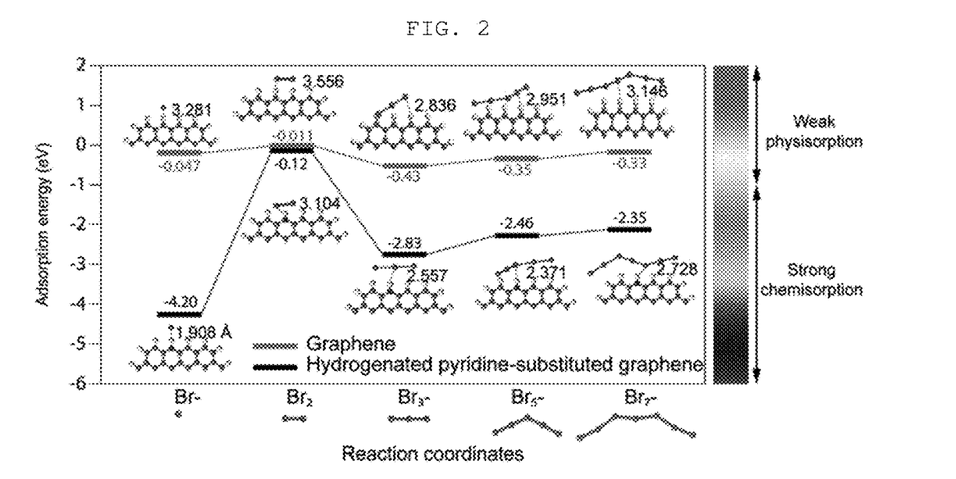
FIG. 2 is a diagram showing theoretical values of adsorption energy of graphene, and a brominated compound and brominated anions depending on whether hydrogenated pyridinic nitrogen is included therein.

Specifically, the pyridinic nitrogen may be positively charged pyridinic nitrogen. An electrolyte for a Zn—Br battery is acidic at pH 1.5 to 5. In this case, because the pyridinic nitrogen is converted into a hydrogenated form under an acidic condition, the pyridinic nitrogen may be present in a positively charged form. The hydrogenated pyridinic nitrogen shows much higher adsorption energy for the brominated anions, compared to the pyridinic nitrogen. Specifically, adsorption energies of common graphene including no hydrogenated pyridinic nitrogen and graphene doped with hydrogenated pyridinic nitrogen were theoretically calculated. The adsorption energy values according to the type of the brominated compound and brominated anions are shown in FIG. 2. As shown in FIG. 2, it can be seen that the graphene doped with hydrogenated pyridinic nitrogen has a much higher adsorption energy value for brominated anions than the common graphene. In addition, because the hydrogenated pyridinic nitrogen may stably bind to the carbon body even during a long-term charging/discharging process, the hydrogenated pyridinic nitrogen may improve performance stability according to the long-term charge/discharge cycles. The results of FIG. 2 suggest that the carbon body doped with hydrogenated pyridinic nitrogen according embodiments of to the present invention has very high adsorption characteristics for the brominated anions.

The carbon body doped with pyridinic nitrogen is a microporous carbon body including micropores. In this case, the micropores may have an average pore size of 0.2 to 3 nm, desirably 0.5 to 2 nm. When the positive electrode for a Zn—Br battery according to embodiments of the present invention includes the micropores whose average pore size falls within this range, the brominated compound and brominated anions generated in the positive electrode during a charging process may be physically adsorbed into the micropores, thereby reducing the crossover to the negative electrode.

The microporous carbon body including the micropores may have a specific surface area of 10 to 2,500 $m^2/g$, desirably 15 to 2,000 $m^2/g$, but the present invention is not limited thereto. Since the microporous carbon body has a high specific surface area, a sufficient reaction site may be provided to the positive electrode, thereby remarkably enhancing oxidation/reduction reaction activities of the brominated compound and brominated anions.

Also, the carbon body doped with pyridinic nitrogen may further include a porous carbon body substrate, and the porous carbon body substrate and the carbon body doped with pyridinic nitrogen may be integrated with each other. Specifically, the porous carbon body substrate may be microporous or macroporous. When the porous carbon body substrate is macroporous, the porous carbon body substrate may be carbon felt, carbon paper, or carbon cloth, but the present invention is not limited thereto. In addition, the macroporous carbon body substrate may have a specific surface area of 10 $m^2/g$ to 1,000 $m^2/g$ and an average electrical conductivity of 100 S/cm to 2,000 S/cm, desirably 300 S/cm to 2,000 S/cm, but the present invention is not limited thereto. When the porous carbon body substrate is microporous, the porous carbon body may be a microporous or mesoporous carbon body having an average pore size of 50 nm or less. Specific examples of the porous carbon body may include activated carbon, carbon nanotubes, or a mesoporous carbon body, but the present invention is not limited thereto. The microporous carbon body substrate may have a specific surface area of 500 $m^2/g$ or more, desirably 600 to 2,500 $m^2/g$, and an average electrical conductivity of 100 S/cm to 2,000 S/cm, desirably 300 S/cm to 2,000 S/cm. Within these ranges, a more sufficient reaction space may be provided to the positive electrode, and resistance to the carbon body doped with pyridinic nitrogen may also be reduced, thereby maintaining low resistance during formation of the integrated structure. The carbon body doped with pyridinic nitrogen may be present in a form in which a surface of the porous carbon body substrate is coated with the carbon body, that is, may be present in the form of a coating layer. In this case, the carbon body doped with pyridinic nitrogen may have an average thickness of 10 nm to 1 mm, desirably 100 nm to 0.5 mm, and more desirably 500 nm to 0.1 mm. The coating layer may be integrated with the porous carbon body substrate, which may mean that the carbon body doped with pyridinic nitrogen is not physically separated or peeled off from the porous carbon body substrate because the carbon body doped with pyridinic nitrogen is chemically integrated with the porous carbon body substrate.

More specifically, the carbon body doped with pyridinic nitrogen may have a polyhedral shape, and unit particles forming a polyhedral shape may have an average particle size of 5 to 100 nm, desirably 20 to 90 nm. Within this range, a high adsorptive force of the brominated compound and brominated anions by the carbon body doped with pyridinic nitrogen may be maintained while stably maintaining a state in which the carbon body doped with pyridinic nitrogen and the porous carbon body substrate are integrated with each other.

Also, embodiments of the present invention provide a Zn—Br battery which includes a negative electrode including a transition metal coated with zinc, the positive electrode according to an exemplary embodiment of the present invention, and an electrolyte, wherein a pH of the electrolyte is in a range of 1.5 to 5.

A drop in open circuit voltage (OCV) of the Zn—Br battery according to embodiments of the present invention may last for 40 hours or more. In this case, the Zn—Br battery according embodiments of to the present invention may have an energy efficiency of 70% or more for 1,000 charge/discharge cycles.

Specifically, the Zn—Br battery may include a positive electrode, a negative electrode, and an electrolyte, and optionally may further include a membrane. A transition metal coated with zinc may be used as the negative electrode material. As a non-limiting example, the transition metal may be platinum (Pt). In this case, the platinum electrochemically deposited with zinc may be used. Also, a $ZnBr_2$ solution having a pH of 1.5 to 5, desirably a pH of 2 to 4 may be used as the electrolyte. Specifically, the pH of the electrolyte may be adjusted using bromic acid (HBr), but the present invention is not limited thereto. When the Zn—Br battery includes a membrane, the membrane may be a film containing a polyolefin, for example, polyethylene or polypropylene, or a fibrous non-woven fabric containing cellulose, polyester, or polypropylene, but the present invention is not limited thereto.

Further, embodiments of the present invention provide a method of manufacturing a positive electrode for a Zn—Br battery, which includes: (S1) subjecting a porous carbon body substrate to hydrophilic surface treatment; (S2) immersing the hydrophilized porous carbon body substrate in a solution including a metal precursor and an organic ligand precursor; (S3) drying the immersed porous carbon body substrate to coat the porous carbon body substrate with nanocrystalline polyhedrons including metal-organic frameworks (MOFs); and (S4) carbonizing the porous carbon body substrate coated with the nanocrystalline polyhedrons. As described above, when the method of manufacturing a positive electrode for a Zn—Br battery according to embodiments of the present invention includes the respective sequential steps, a positive electrode for a Zn—Br battery, which includes micropores and shows high adsorption characteristics for brominated anions, may be obtained.

The step (S1) is a step of subjecting a porous carbon body substrate to hydrophilic surface treatment. In this case, the step (S1) may be performed at 400 to 800° C., desirably 400 to 700° C. under an oxidizing atmosphere, and may also be performed by heat treatment for 5 to 15 hours, desirably 8 to 12 hours under an oxidizing atmosphere, but the present invention is not limited thereto. The oxidizing atmosphere during the heat treatment may be an oxygen or ozone atmosphere. In this case, a gas atmosphere that may oxidize a surface of the carbon body is not limited thereto.

A surface of the porous carbon body substrate subjected to the hydrophilic surface treatment under the condition may be easily coated with the nanocrystalline polyhedrons, and the porous carbon body and the nanocrystalline polyhedrons may also be integrated with each other. When the nanocrystalline polyhedrons are integrated with the porous carbon body, a coating layer may be stably formed on the porous carbon body substrate without peeling off or separating the nanocrystalline polyhedrons from the porous carbon body substrate, and mechanical strength may be maintained, thereby manufacturing a positive electrode for a Zn—Br battery having a high strength. Specifically, the porous carbon body substrate may be carbon felt, carbon paper, or carbon cloth, but the present invention is not limited thereto.

The steps (S2) and (S3) are steps of coating the hydrophilized porous carbon body substrate obtained in the step (S1) with nanocrystalline polyhedrons including metal-organic frameworks. In this case, the steps (S2) and (S3) are performed by immersing the hydrophilized porous carbon body in a solution including a metal precursor and an organic ligand precursor, followed by drying the porous carbon body.

Specifically, the metal precursor may be in the form of a metal salt including metal ions belonging to Groups 3 to 16. Preferably, the metal ions may be metal ions belonging to Groups 4 to 12. Anions binding to the metal ions in the metal salt are not limited as long as the anions can be dissolved in a solvent. Specifically, the anions binding to the metal ions may be anions that may be dissolved in water. As a non-limiting example, the metal precursor may include inorganic acid salts of metals such as metal nitrate, metal sulfate, metal phosphate, metal hydrochloride, or the like. Also, the organic ligand precursor may include one or more selected from pyridine-based, imidazole-based, and nitrile-based compounds, but the present invention is not limited thereto.

Specifically, the step (S2) may be performed by immersing the hydrophilized porous carbon body manufactured in the step (S1) in a solution obtained by mixing the metal precursor, the organic ligand precursor, and the solvent as described above. A molar ratio of the metal precursor and the organic ligand precursor may be in a range of 1:1 to 1:50, desirably 1:4 to 1:20, and a weight ratio of the metal precursor and the solvent may be in a range of 1:5 to 1:100, desirably 1:10 to 1:80. In this case, the solvent may be a polar solvent. Specifically, the solvent may include one or more selected from the group consisting of acetone, methanol, ethanol, and water, but the present invention is not limited thereto.

Also, the drying process in the step (S3) may be performed for 2 to 20 hours under a condition of 30 to 80° C., and may be performed under a vacuum state in a non-limiting manner. A surface of the porous carbon body substrate may be uniformly coated with the nanocrystalline polyhedrons including metal-organic frameworks (MOFs), which have a high specific surface area, by means of the drying process. The nanocrystalline polyhedrons may have an average particle size of 5 to 200 nm, desirably 10 to 150 nm. Specifically, the metal-organic frameworks may be zeolitic-imidazolate frameworks (ZIFs), and more specifically may be ZIF-8.

The step (S4) is a step of carbonizing the porous carbon body substrate, and may be performed by heat-treating the porous carbon body substrate coated with the nanocrystalline polyhedrons at 500 to 1,200° C., desirably 600 to 1,000° C. Most desirably, the porous carbon body substrate may be heat-treated at 650 to 750° C. In this case, it is desirable that a content of pyridinic nitrogen in the carbon body may be maximized and a content of graphitic nitrogen may be reduced by heat-treating the porous carbon body substrate under this condition.

Specifically, the porous carbon body substrate may be heat-treated for 2 to 10 hours, desirably 3 to 8 hours under an Ar atmosphere while increasing the temperature at a heating rate of 5° C./min, and then re-cooled to room temperature. The porous carbon body substrate subjected to the carbonization process may be further subjected to additional steps of stirring the porous carbon body substrate in a solution of 1 to 3 M hydrochloric acid for 10 hours or more, washing the porous carbon body substrate with each of distilled water, ethanol, and acetone, and then drying the porous carbon body substrate at 60 to 120° C.

Hereinafter, the present invention will be described in detail with reference to Examples thereof. However, it should be understood that the following Examples are illustrative only to describe the present invention in detail, but are not intended to limit the scope of the present invention.

Example 1

Manufacture of ZIF-8-GF (Graphite Felt, GF):

a) Graphite felt (GFD 4.6, SGL Group) with a size of 20×30×4 mm$^3$ was heat-treated at 520° C. for 9 hours under an oxygen atmosphere, and then cooled to room temperature.

b) 5.95 g of zinc nitrate hexahydrate and 13.14 g of 2-methyl imidazole were each sufficiently dissolved in 100 mL of methanol, and 15 mL of each of the solutions was then taken and thoroughly mixed for a minute while stirring. Thereafter, the resulting mixture was then added to a beaker containing the heat-treated graphite felt, and kept for 6 hours. Then, the graphite felt was taken out from the mixed solution, and then sufficiently washed with methanol.

The step b) was repeated three times to obtain ZIF-8-GF. Finally, the ZIF-8-GF was sufficiently dried at 50° C.

Manufacture of NGF (Pyridinic Nitrogen-Doped Microporous Carbon Decorated on Graphite Felt):

The resulting ZIF-8-GF was carbonized at 700° C. for 5 hours at a heating rate of 5° C./min under an Ar atmosphere, and then cooled to room temperature. Thereafter, the carbonized ZIF-8-GF was put into a beaker containing 2 M hydrochloric acid, and stirred at 60° C. for 12 hours to obtain NGF. Finally, the NGF was washed with 100 mL of distilled water, 100 mL of ethanol, and 100 mL of acetone in a specified order, and then dried at 100° C. for 12 hours to obtain NGF-700.

Figure 3:
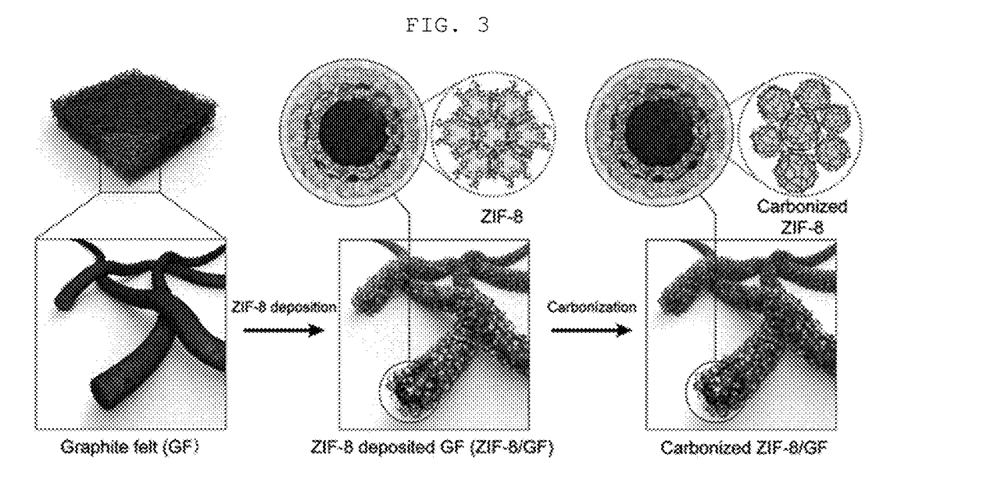
FIG. 3 is a diagram schematically showing a process of manufacturing nitrogen-doped graphite felt (NGF) manufactured according to an exemplary embodiment of the present invention.

A process of manufacturing the ZIF-8-GF and the NGF is schematically shown in FIG. 3. As shown in FIG. 3, the process includes: oxidizing a surface of graphite felt, forming ZIF-8 on the oxidized surface of the graphite felt, and carbonizing the ZIF-8 formed on the graphite felt. In this case, a carbon body (NGF) doped with pyridinic nitrogen, which was integrated onto the porous carbon body substrate was manufactured by means of the series of sequential steps.

A scanning electron microscope image of the obtained NGF-700 was analyzed. The results are shown in (a) of FIG. 4.

Next, the NGF-700 was sonicated in ethanol for 10 minutes to separate carbonized ZIF-8 particles, and the separated particles were analyzed using a transmission electron microscope. The results are shown in (b) and (c) of FIG. 4.

Finally, the separated particles were subjected to scanning electron microscope analysis and energy dispersive spectrometry (EDS) analysis. The results are shown in (d) to (f) of FIG. 4.

Figure 4:
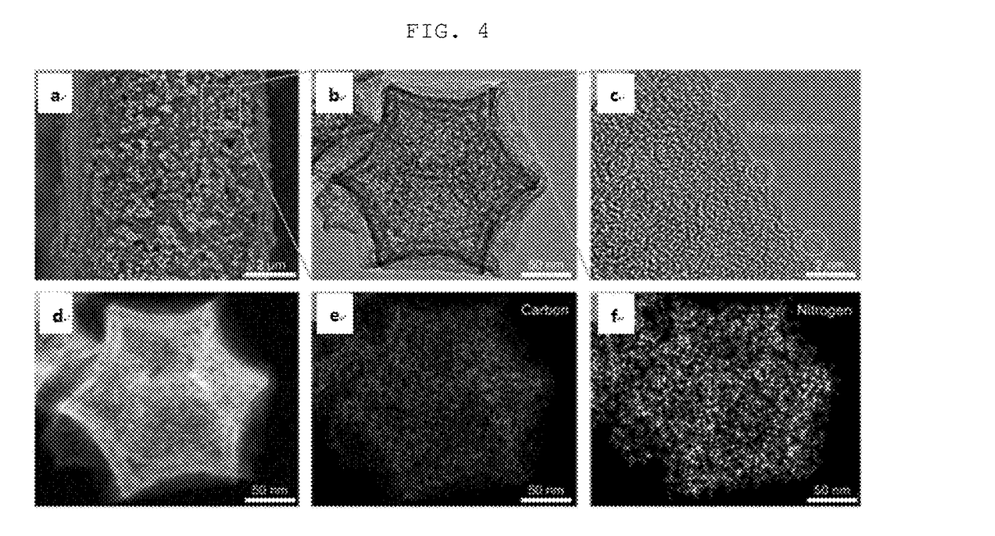
FIG. 4 is a diagram showing a scanning electron microscope image of NGF manufactured according to an exemplary embodiment of the present invention, and showing transmission electron microscope image analysis, scanning electron microscope image analysis and energy dispersive spectrometry (EDS) analysis of carbonized ZIF-8 particles separated from the manufactured NGF.

As shown in (a) of FIG. 4, it can be seen that a carbonized ZIF-8 layer was uniformly formed on a surface of GF.

As shown in (b) of FIG. 4, it can be seen that the ZIF-8 particles showed a polyhedral shape and had an average particle size of less than 90 nm even after the ZIF-8 particles were carbonized. As shown in (c) of FIG. 4, it can also be seen that micropores having an average pore size of 2 nm or less were formed on the carbonized ZIF-8 particles.

Also, as shown in (e) and (f) of FIG. 4, it can be seen that carbon and nitrogen were uniformly distributed on the particles.

Example 2

This example was performed in the same manner as in Example 1, except that the carbonization temperature was set to 600° C. instead of 700° C. The resulting NGF was named 'NGF-600.'

Example 3

This example was performed in the same manner as in Example 1, except that the carbonization temperature was set to 800° C. instead of 700° C. The resulting NGF was named 'NGF-800.'

Example 4

This example was performed in the same manner as in Example 1, except that the carbonization temperature was set to 900° C. instead of 700° C. The resulting NGF was named 'NGF-900.'

Example 5

This example was performed in the same manner as in Example 1, except that the carbonization temperature was set to 1,000° C. instead of 700° C. The resulting NGF was named 'NGF-1000.'

Comparative Example

Pristine graphite felt (GFD 4.6, SGL Group) with a size of 20×30×4 mm$^3$ was used, and named 'GF.'

Experimental Example 1: Analysis of Scanning Electron Microscope Image

The NGFs manufactured in Examples 1 to 5 were subjected to scanning electron microscope image analysis and EDS analysis. The results are shown in FIG. 5.

Figure 5:
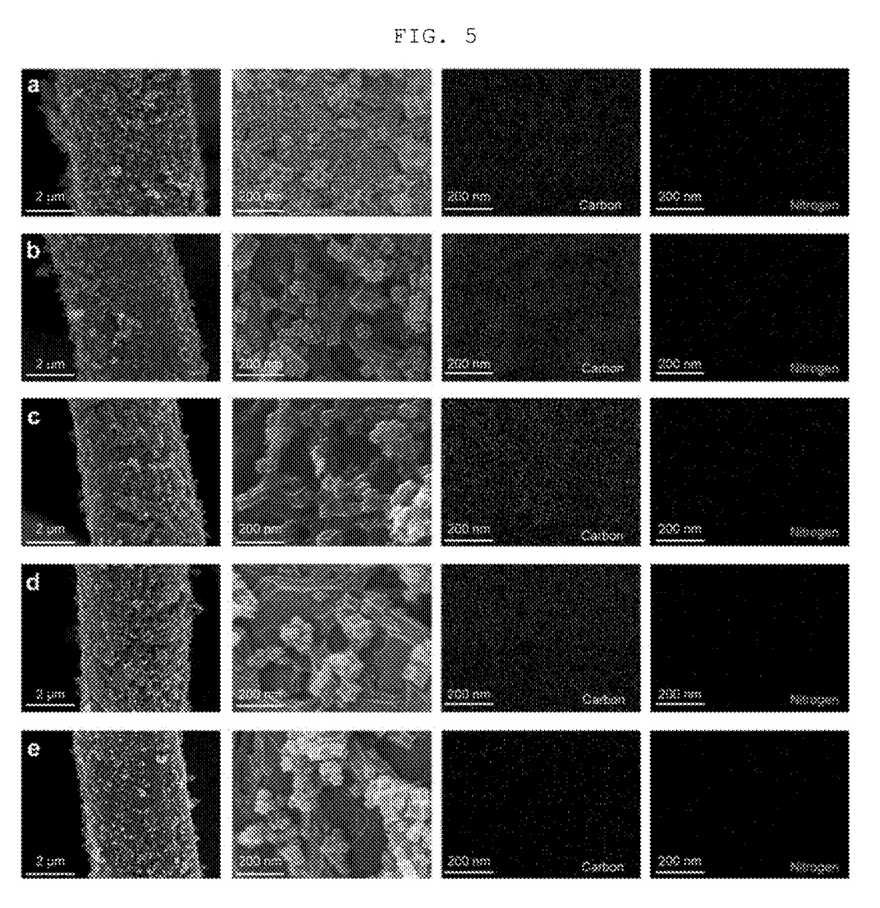
FIG. 5 is a diagram showing the results of scanning electron microscope image analysis and energy dispersive spectrometry (EDS) analysis of the NGF manufactured according to an exemplary embodiment of the present invention.

Specifically, (a), (b), (c), (d), and (e) of FIG. 5 show the result of scanning electron microscope image analysis and EDS analysis of NGF-600, NGF-700, NGF-800, NGF-900, and NGF-1000, respectively. It can be seen that the higher the carbonization temperature was, the smoother a surface of NGF was.

Experimental Example 2: XPS Analysis

The NGFs manufactured in Examples 1 to 5 were subjected to XPS analysis. The results are shown in FIG. 6.

Figure 6:
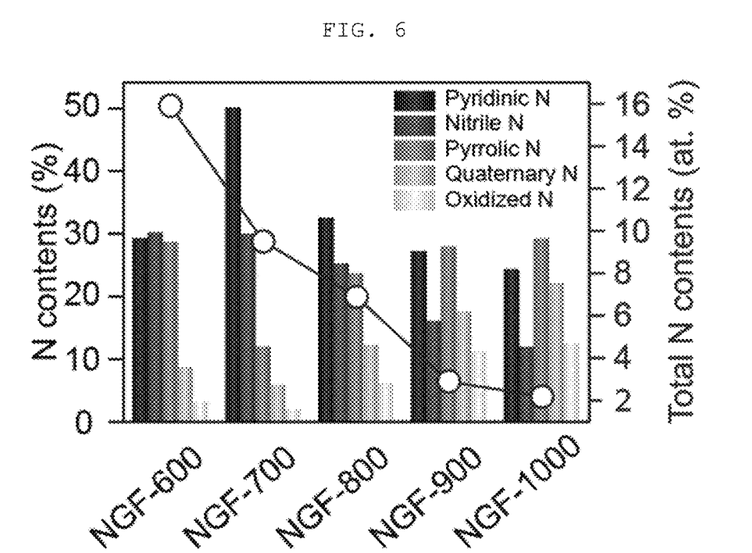
FIG. 6 is a diagram showing the results of X-ray photoelectron spectroscopy (XPS) analysis of the NGF manufactured according to an exemplary embodiment of the present invention.

As shown in FIG. 6, it can be seen that the total nitrogen content (atom %) of NGF tended to decrease as the carbonization temperature increased. Specifically, it can be seen that the total nitrogen contents of NGF-600 to NGF-1000 were shown to be 16.7%, 9.8%, 7.1%, 3.1% and 2.3%, respectively, in a specified order, and that the content (atom %) of pyridinic nitrogen (pyridinic N) was shown to be 50.14% in NGF-700, which was the highest with respect to the total nitrogen content. Specifically, as the carbonization temperature increased from 600° C. to 700° C., pyrrolic nitrogen (pyrrolic N) was converted into pyridinic nitrogen, resulting in a sharp decrease in content of the pyrrolic nitrogen and a sharp increase in content of the pyridinic nitrogen. However, it can be seen that, as the pyridinic nitrogen was converted into quaternary nitrogen (quaternary N) at a carbonization temperature of 800° C. or higher, the content of the pyridinic nitrogen decreased and the content of the quaternary nitrogen increased again, and the contents of oxidized nitrogen (oxidized N) and pyrrolic nitrogen also increased.

Experimental Example 3: BET Analysis

The NGFs manufactured in Examples 1 to 5 were subjected to BET specific surface area analysis. The results are shown in FIG. 7.

Figure 7:
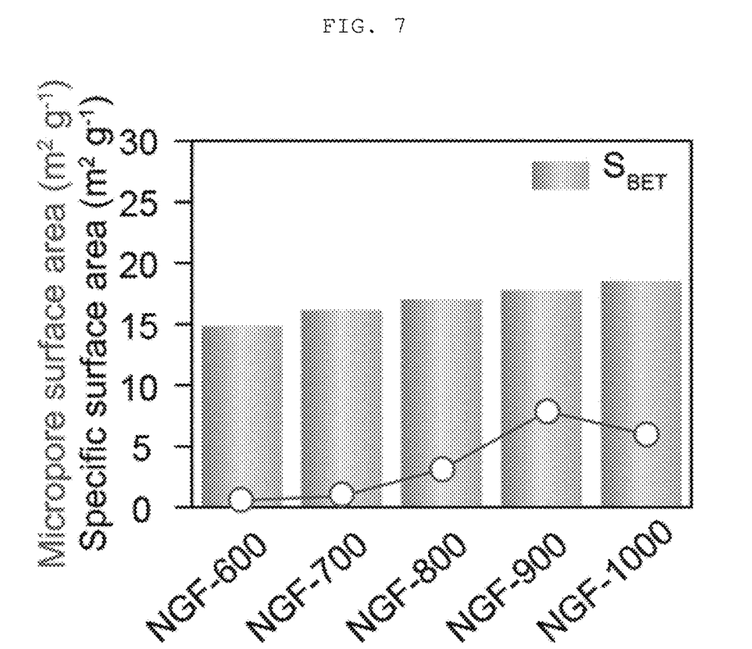
FIG. 7 is a diagram showing the results of BET (Brunauer Emmett Teller) specific surface area analysis of the NGF manufactured according to an exemplary embodiment of the present invention.

As shown in FIG. 7, it can be seen that the specific surface area increased as the carbonization temperature increased. Specifically, it can be seen that the specific surface areas of NFG-600, NFG-700, NFG-800, NFG-900, and NFG-1000 were 14.8 m$^2$/g, 16.1 m$^2$/g, 17.0 m$^2$/g, 17.7 m$^2$/g, and 18.5 m$^2$/g, respectively, indicating that NFG-1000 had the highest specific surface area.

Also, it can be seen that a surface area of the micropores increased in most cases but rather decreased in the case of NGF-1000 as the carbonization temperature increased. This was estimated that the micropores were decomposed at 1,000° C. or higher.

Experimental Example 4: Ar Adsorption Isotherm Analysis

The NGFs manufactured in Examples 1 to 5 were subjected to Ar adsorption isotherm analysis. The results are shown in FIG. 8.

Figure 8:
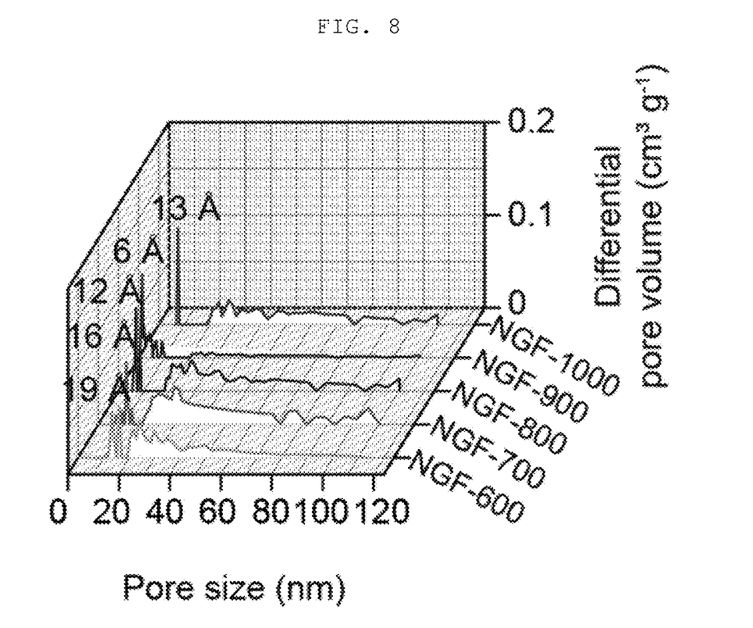
FIG. 8 is a diagram showing the results of Ar adsorption isotherm analysis of the NGF manufactured according to an exemplary embodiment of the present invention.

As can be seen in FIG. 8, an average pore size of the micropore introduced into the NGF manufactured according to embodiments of the present invention was in a range of 0.6 to 1.9 nm, and a size of the micropores tended to decrease as the carbonization temperature increased from 600° C. to 900° C. and increased again at 1,000° C.

Experimental Example 5: Spectroscopic Analysis

Among the NGFs of Examples 1 to 5, NGF-700 (Example 1) having the highest pyridinic nitrogen content (atom %); NGF-1000 (Example 5) having the highest specific surface area; and GF (Comparative Example) were evaluated for adsorption abilities of the brominated ions and bromine compound.

Figure 9:
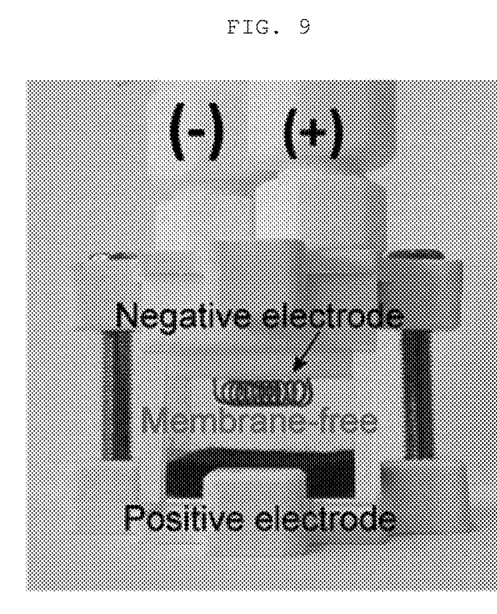
FIG. 9 is a diagram showing a structure of a membraneless flowless Zn—Br battery (MLFL-ZBB) configured using pristine GF and the NGF manufactured according to an exemplary embodiment of the present invention as a positive electrode.

Specifically, as shown in FIG. 9, each of GF, NGF-1000, and NGF-700 was used as the positive electrode, and disposed beneath a sealed glass container, and a Zn electrode was disposed on the sealed glass container. Thereafter, 2.25 M ZnBr$_2$ was used as an electrolyte solution to constitute MLFL-ZBB. Then, the MLFL-ZBB was charged at a current density of 5 mA/cm$^2$ for an hour. During a charging process, images of the MLFL-ZBB were photographed at intervals of 10 minutes. The results are shown in (a) of FIG. 10.

Figure 10:
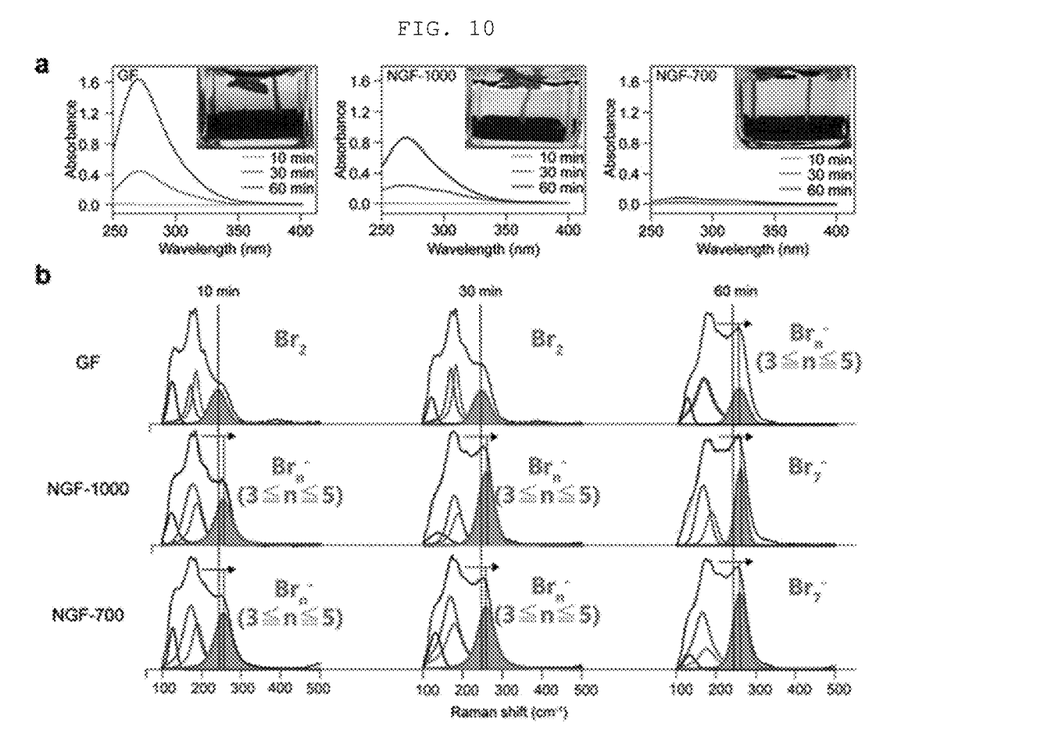
FIG. 10 is a diagram showing an image of a color change of an electrolyte solution according to the charging time of the MLFL-ZBB configured using the pristine GF and the NGF manufactured according to an exemplary embodiment of the present invention as the positive electrode, and showing the results of ultraviolet-visible spectroscopy analysis and Raman spectroscopy analysis of the MLFL-ZBB.

As shown in (a) of FIG. 10, it can be seen that an electrolyte present at a side of the positive electrode gradually turned yellow as the charging process proceeded, indicating that the brominated ions or the bromine compound were released from the positive electrode. In particular, it can be seen that, when the GF was used as the positive electrode, a color change was observed 10 minutes after the charging, and a color of the whole electrolyte turned 60 minutes after the charging. On the contrary, it can be seen that, when the NGF-1000 and NGF-700 were used as a positive electrode, a color change was not significant during a charging process, indicating that the brominated ions or the bromine compound were efficiently adsorbed onto the positive electrode. In particular, the NGF-700 has a much more efficient adsorption effect.

Also, during the charging process of each of the MLFL-ZBBs, an electrolyte solution around the positive electrode was sampled at charging time intervals of 10, 30, and 60 minutes, and then subjected to UV analysis. The results are shown in (a) of FIG. 10.

As shown in (a) of FIG. 10, it can be seen that the absorbances of the GF, NGF-1000, and NGF-700 at 270 nm, which is the maximum absorption wavelength for $Br_2$ and polybromide ions, were observed in a decreasing order. In particular, it can be seen that the NGF-700 showed very low absorbance after a charging time of 60 minutes, indicating that the crossover of the $Br_2$ and polybromide ions was effectively inhibited.

That is, it can be seen that an effect of the high pyridinic nitrogen content of the NGF-700 may be more greatly exerted on the adsorption effect of the brominated ions and the bromine compound, compared to an effect of the high specific surface area of the NGF-1000.

Also, to determine the conversion efficiency of $Br^-$ into $Br_2$ and $Br_2$ into the polybromide anions in the positive electrode during the charging process of the MLFL-ZBB, an electrolyte solution included in each of positive electrodes was sampled at charging time intervals of 10, 30, and 60 minutes, and then subjected to Raman analysis. The results are shown in (b) of FIG. 10.

As shown in (b) of FIG. 10, it can be seen that a peak of $Br_2$ appeared mainly in a charging time of 30 minutes and a peak of the polybromide ions appeared after 30 minutes in the case of the GF.

Meanwhile, it can be seen that a peak of the polybromide ions appeared at the beginning of charging and the conversion of $Br^-$ into $Br_2$ and the generation of the polybromide anions were accomplished more rapidly in the case of the NGF-1000 and NGF-700, compared to those of the GF.

Experimental Example 6: Electrochemical Analysis

Each of the NGF-700 manufactured in Example 1; NGF-1000 manufactured in Example 5; and the GF manufactured in Comparative Example was cut into pieces with a size of 1×1 $cm^2$, and then used as a working electrode. Also, EIS analysis was performed under conditions of a frequency range of 1,000 kHz to 0.01 Hz and an amplitude of 10 mV using a platinum electrode, an Ag/AgCl electrode, and 2.25 M $ZnBr_2$ as a counter electrode, a reference electrode, and an electrolyte solution, respectively. The results are shown in FIG. 11.

Figure 11:
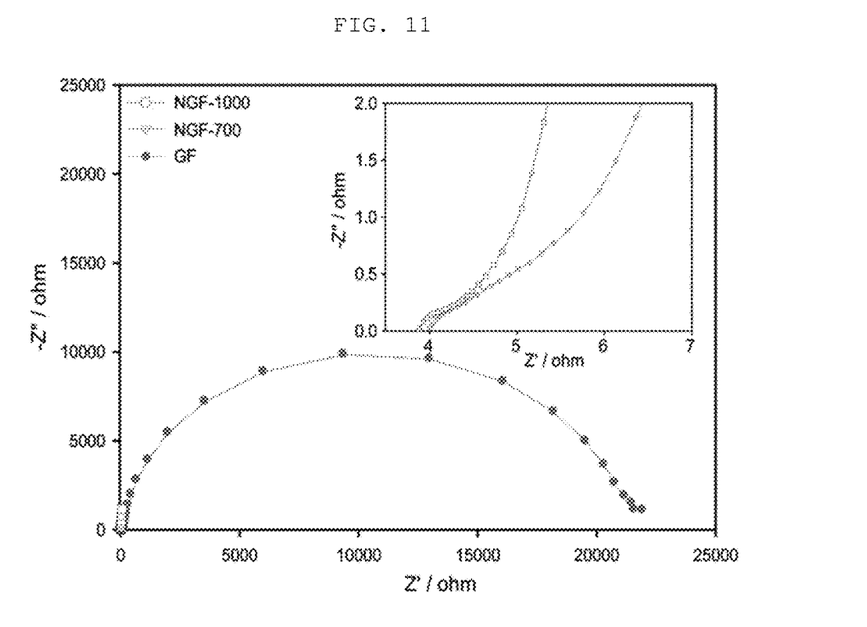
FIG. 11 is a diagram showing the results of electrochemical impedance spectroscopy (EIS) analysis of the NGF manufactured according to an exemplary embodiment of the present invention.

As shown in FIG. 11, it can be seen that both the NGF-700 and NGF-1000 showed much lower resistance, compared to the GF. Specifically, in the impedance graph, the diameter of a semicircle represents the charge transfer resistance. Therefore, as the diameter was smaller, the resistance was lower, and the electrochemical characteristics were superior. As shown in FIG. 11, it can be seen that the NGF-700 and NGF-1000 showed remarkably reduced charge transfer resistance because the NGF-700 and NGF-1000 had a much smaller semicircle diameter, compared to the GF. Further, it can be seen that the NGF-1000 had a lower resistant value than the NGF-700.

Experimental Example 7: MLFL-ZBB Charge/Discharge Test

Each of the NGF-700 manufactured in Example 1; the NGF-1000 manufactured in Example 5; and the GF manufactured in Comparative Example was used as the positive electrode, and disposed in a rectangular quartz tube with a size of 2×2×2 $cm^3$. Then, a Zn-coated platinum electrode was used as the negative electrode, and 2.25 M $ZnBr_2$ (pH 3.8) was used as the electrolyte solution to constitute an MLFL-ZBB cell.

Figure 12:
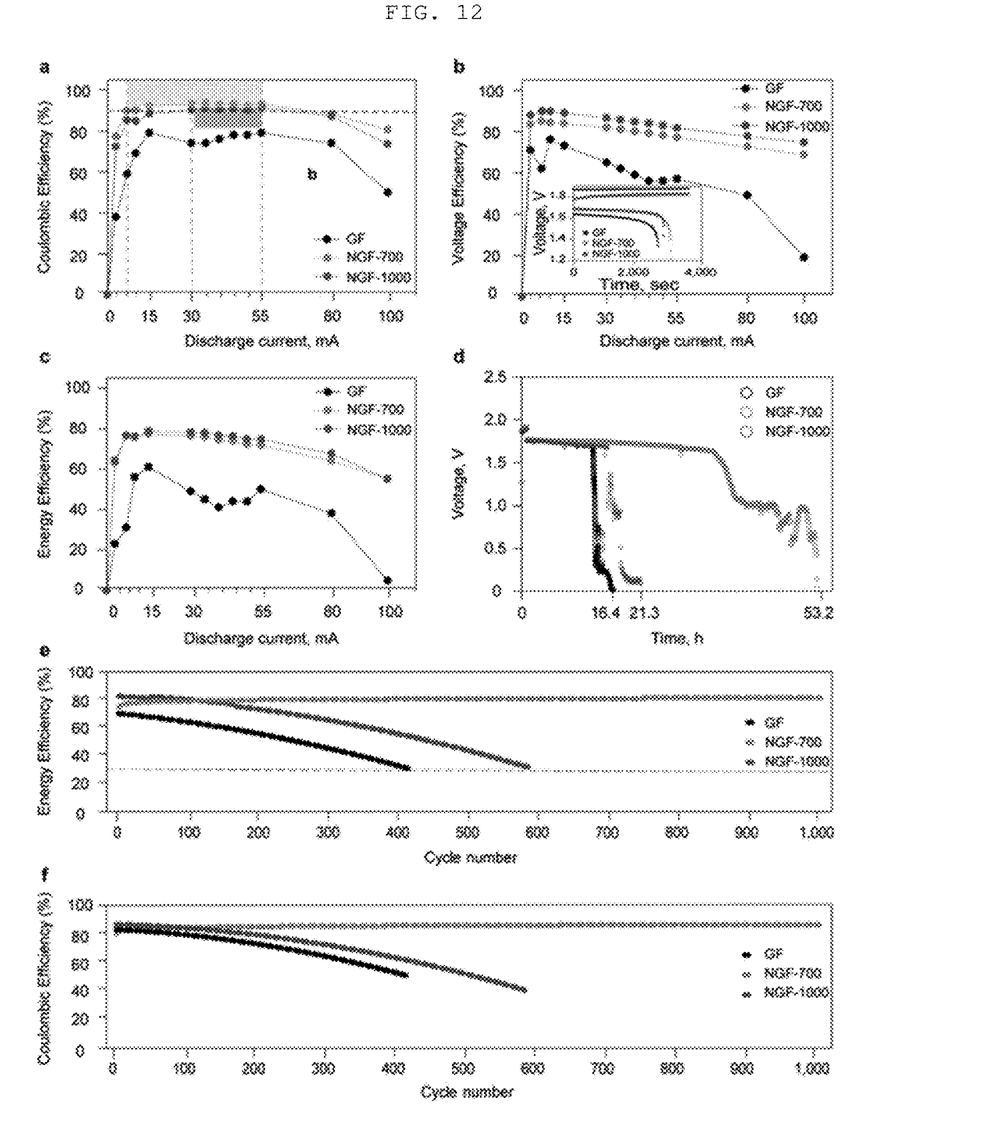
FIG. 12 is a diagram showing the results of electrochemical analysis of the MLFL-ZBB configured using the NGF manufactured according to an exemplary embodiment of the present invention as the positive electrode.

Next, the MLFL-ZBB cell was charged at a charge current of 20 mA and a capacity of 20 mAh, and then discharged according to a discharge current. The results are shown in (a) to (c) of FIG. 12. Specifically, FIG. 12 shows (a) the current efficiency; (b) the voltage efficiency; and (c) the energy efficiency according to the discharge current.

As shown in (a) of FIG. 12, as the discharging time increased, the cell was severely self-discharged at a low discharge current to show low current efficiency. As the discharge current increased, the current efficiency tended to increase and then decreased again at 55 mA or more. All of the GF, NGF-700 and NGF-1000 showed a similar tendency, but the NGF-700 and NGF-1000 had a higher current efficiency value than the GF, and the NGF-700 showed slightly higher current efficiency than the NGF-1000.

Also, as can be seen in (b) of FIG. 12, as the discharge current increased, the voltage efficiency tended to decrease. Both of the NGF-700 and NGF-1000 showed higher voltage efficiency than the GF, but the NGF-1000 showed slightly higher voltage efficiency than the NGF-700.

Therefore, as can be seen in (c) of FIG. 12, the GF had an energy efficiency of 60% or less at a discharge current of 7 to 15 mA, whereas the NGF-700 and NGF-1000 had a high energy efficiency of approximately 80%.

Next, to judge a degree of self-discharge of each of the MLFL-ZBBs, an open circuit voltage (OCV) retention test was carried out. Specifically, the degree of self-discharge was evaluated by measuring a rate of decrease in OCV of the charged MLFL-ZBB cell with time. The results are shown in (d) of FIG. 12.

As shown in (d) of FIG. 12, it can be seen that the time required for the OCV to drop to 0 V was shown to be 16.4 hours in the case of GF, but the time required for the OCV to drop to 0 V was shown to be 21.3 hours and 53.2 hours in the case of the NGF-1000 and NGF-700, respectively, indicating the NGF-700 remarkably reduced the self-discharge of the MLFL-ZBB cell. These results were consistent with the results of (a) of FIG. 10 as previously described above. Also, it can be seen that an effect of the high pyridinic N content of the NGF-700 may be more greatly exerted on the adsorption effect of the brominated ions and the bromine compound, compared to an effect of the high specific surface area and microporous structure of the NGF-1000, thereby remarkably reducing an effect of the self-discharge according to the crossover.

Then, a long-term charging/discharging test was performed on each of the MLFL-ZBBs. The results are shown in (e) and (f) of FIG. 12.

As shown in (e) of FIG. 12, it can be seen that, as the charge/discharge cycles increased, the energy efficiency of the GF was reduced at a high speed, and the energy efficiency after 414 cycles dropped to 30% or less, and that the energy efficiency of NGF-1000 was reduced at a slower speed than that of the GF, but the energy efficiency after 587 cycles dropped to 30% or less. On the contrary, it can be seen that approximately 80% of the energy efficiency was maintained even after 1,000 cycles in the case of the NGF-700.

As shown in (f) of FIG. 12, it can be seen that the current efficiency according to the charge/discharge cycles also showed a tendency similar to a change in the energy efficiency, and the NGF-700 showed a current efficiency of approximately 90% even after 1,000 cycles.

Experimental Example 8: Analysis of Degradation of Electrodes and Electrolyte Solution after Long-Term Charge/Discharge Test of MLFL-ZBB To analyze degrees of degradation of the positive electrode and the negative electrode, after the 1,000 charge/discharge cycles, each of the positive electrode, the negative electrode, and the electrolyte solution was observed. The results are shown in FIG. 13.

Figure 13:
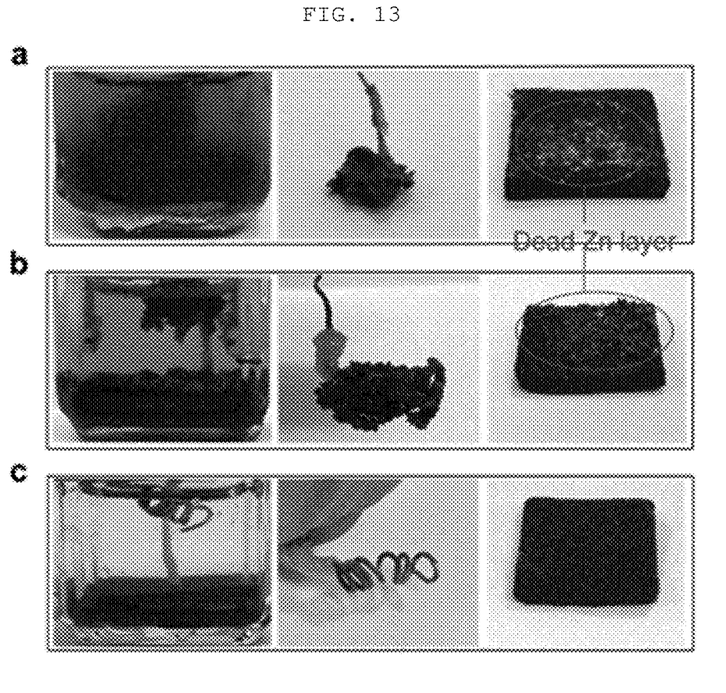
FIG. 13 is a diagram showing an image of changes in an electrode and an electrolyte solution after a long-term charge/discharge test is performed on the MLFL-ZBB including the NGF manufactured according to an exemplary embodiment of the present invention.

FIG. 13 shows images of the electrodes and the electrolyte solution after the MLFL-ZBB including (a) the GF, (b) the NGF-1000, and (c) the NGF-700 are charged and discharged for 1,000 cycles.

As shown in FIG. 13, it can be seen that the severe changes in the electrolyte solution and the electrodes were caused after a long-term charging/discharging process in the case of the MLFL-ZBB including the GF. Specifically, even after the discharging was completed, the electrolyte solution appeared dark green, indicating that large amounts of the $Br_2$ and polybromide ions were included in the electrolyte solution. Also, it can be seen that a large amount of Zn residues were generated in the negative electrode, and that a layer of Zn detached from the negative electrode was formed on a surface of the positive electrode. Further, it can be seen that, in the case of the MLFL-ZBB including the NGF-1000, the electrodes and the electrolyte solution were not be severely changed compared to the GF, but were also degraded.

On the contrary, it can be seen that, even after the MLFL-ZBB including the NGF-700 was charged and discharged for 1,000 cycles, a color change of the electrolyte solution was very small, no Zn residues were generated in the negative electrode, and the positive electrode was kept very clean without formation of the Zn layer.

The positive electrode for a Zn—Br battery according to embodiments of the present invention has an advantage in that the brominated anions can be adsorbed with high efficiency, thereby remarkably enhancing the current efficiency and voltage efficiency of the zinc-bromine battery.

Also, the Zn—Br battery including the positive electrode for a Zn—Br battery according to embodiments of the present invention has an advantage in that the Zn—Br battery can have an energy efficiency of 80% or more even after 1,000 charge/discharge cycles, thereby remarkably enhancing the stability.

Although the effects are not explicitly mentioned in embodiments of the present invention, the effects described in the specification, which are expected by the technical features of the present invention, and provisional effects thereof are handled as described above in the specification.

What is claimed is:

1. A positive electrode for a Zn—Br battery comprising a porous carbon body substrate and a carbon body doped with pyridinic nitrogen, wherein a surface of the porous carbon body substrate is coated with the carbon body doped with pyridinic nitrogen.

2. The positive electrode for a Zn—Br battery of claim 1, wherein the Zn—Br battery is a membraneless flowless Zn—Br battery.

3. The positive electrode for a Zn—Br battery of claim 1, wherein the carbon body doped with pyridinic nitrogen is a microporous carbon body comprising micropores.

4. The positive electrode for a Zn—Br battery of claim 3, wherein the micropore has an average pore size of 0.2 to 3 nm.

5. The positive electrode for a Zn—Br battery of claim 1, wherein the pyridinic nitrogen is present at 30 atom % or more with respect to the total nitrogen content of the nitrogen-doped carbon body.

6. The positive electrode for a Zn—Br battery of claim 1, wherein the pyridinic nitrogen is positively charged pyridinic nitrogen.

7. The positive electrode for a Zn—Br battery of claim 1, wherein the porous carbon body substrate and the carbon body doped with pyridinic nitrogen are integrated with each other.

8. The positive electrode for a Zn—Br battery of claim 1, wherein adsorption energies of the carbon body doped with pyridinic nitrogen and brominated anions satisfy the following Expression 1:

$$E_{Ad-CN}/E_{Ad-C} > 5 \quad \text{[Expression 1]}$$

(Wherein $E_{Ad-CN}$ represents an adsorption energy of a carbon body doped with pyridinic nitrogen and brominated anions, and $E_{Ad-C}$ represents an adsorption energy of a carbon body and brominated anions).

9. A Zn—Br battery comprising:
a negative electrode comprising a transition metal coated with zinc;
the positive electrode selected according to claim 1; and
an electrolyte,
wherein a pH of the electrolyte is in a range of 1.5 to 5.

10. The Zn—Br battery of claim 9, wherein a drop in open circuit voltage of the Zn—Br battery lasts for 40 hours or more.

11. The Zn—Br battery of claim 9, wherein the Zn—Br battery has an energy efficiency of 70% or more for 1,000 charge/discharge cycles.

12. A method of manufacturing the positive electrode for a Zn—Br battery of claim 1, comprising:
(S1) subjecting a porous carbon body substrate to hydrophilic surface treatment;
(S2) immersing the hydrophilized porous carbon body substrate in a solution including a metal precursor and an organic ligand precursor;
(S3) drying the immersed porous carbon body substrate to coat the porous carbon body substrate with nanocrystalline polyhedrons including metal-organic frameworks (MOFs); and
(S4) carbonizing the porous carbon body substrate coated with the nanocrystalline polyhedrons.

13. The method of claim 12, wherein the metal-organic frameworks are zeolitic-imidazolate frameworks (ZIFs).

14. The method of claim 12, wherein the carbonization process of the step (S4) is performed at 500 to 1,200° C.

15. The method of claim 12, wherein the hydrophilic surface treatment process of the step (S1) is performed at 400 to 800° C. under an oxidizing atmosphere.

16. The positive electrode for a Zn—Br battery of claim 1, wherein the porous carbon body substrate is carbon felt, carbon paper or carbon cloth.

* * * * *